(12) United States Patent
Harada et al.

(10) Patent No.: US 10,195,744 B2
(45) Date of Patent: Feb. 5, 2019

(54) CONTROL DEVICE, ROBOT, AND ROBOT SYSTEM

(71) Applicant: Seiko Epson Corporation, Tokyo (JP)

(72) Inventors: Atsushi Harada, Matsumoto (JP); Kenji Onda, Azumino (JP)

(73) Assignee: Seiko Epson Corporation (JP)

( * ) Notice: Subject to any disclaimer, the term of this patent is extended or adjusted under 35 U.S.C. 154(b) by 323 days.

(21) Appl. No.: 15/256,979

(22) Filed: Sep. 6, 2016

(65) Prior Publication Data
US 2017/0066137 A1    Mar. 9, 2017

(30) Foreign Application Priority Data

Sep. 7, 2015 (JP) ................................. 2015-175430

(51) Int. Cl.
*G05B 15/00* (2006.01)
*G05B 19/00* (2006.01)
*B25J 13/08* (2006.01)
*B25J 9/16* (2006.01)

(52) U.S. Cl.
CPC ........... *B25J 13/085* (2013.01); *B25J 9/1633* (2013.01); *Y10S 901/09* (2013.01); *Y10S 901/46* (2013.01)

(58) Field of Classification Search
CPC ..... B25J 13/085; B25J 9/1633; Y10S 901/09; Y10S 901/46
See application file for complete search history.

(56) References Cited

U.S. PATENT DOCUMENTS

| | | | |
|---|---|---|---|
| 2009/0105880 A1* | 4/2009 | Okazaki | B25J 9/1633 700/258 |
| 2009/0173560 A1* | 7/2009 | Nakamoto | B25J 5/00 180/167 |
| 2011/0015785 A1* | 1/2011 | Tsusaka | B25J 9/0003 700/254 |
| 2013/0030569 A1* | 1/2013 | Fudaba | G05B 19/423 700/245 |
| 2014/0107843 A1* | 4/2014 | Okazaki | B25J 13/085 700/260 |
| 2014/0277720 A1* | 9/2014 | Izumi | B25J 9/1687 700/253 |
| 2015/0127141 A1* | 5/2015 | Kawada | B25J 9/0087 700/206 |

(Continued)

FOREIGN PATENT DOCUMENTS

| | | |
|---|---|---|
| JP | 2000-094370 A | 4/2000 |
| JP | 3671694 B2 | 7/2005 |
| JP | 2010-023184 A | 2/2010 |

*Primary Examiner* — Harry Y Oh
(74) *Attorney, Agent, or Firm* — Harness, Dickey & Pierce, P.L.C.

(57) ABSTRACT

A control device controls a robot including an arm, an end effector provided in the arm, and a force detector provided in the arm and configured to detect force. After bringing a first portion of the end effector close to a work surface and detecting contact of the first portion and the work surface on the basis of an output from the force detector, the control device brings a second portion of the end effector different from the first portion close to the work surface, detects contact of the second portion and the work surface on the basis of an output from the force detector, and teaches the robot a position of the end effector with respect to the work surface.

8 Claims, 8 Drawing Sheets

(56) References Cited

U.S. PATENT DOCUMENTS

2015/0343634 A1* 12/2015 Kiyosawa .............. B25J 9/1612
　　　　　　　　　　　　　　　　　　　　　700/228
2015/0343641 A1* 12/2015 Maruyama ............ B25J 9/1697
　　　　　　　　　　　　　　　　　　　　　700/259
2015/0352716 A1* 12/2015 Sonehara ............... B25J 9/1633
　　　　　　　　　　　　　　　　　　　　　700/261

* cited by examiner

CONTROL DEVICE, ROBOT, AND ROBOT SYSTEM

BACKGROUND

1. Technical Field

The present invention relates to a control device, a robot, and a robot system.

2. Related Art

There has been known a robot system including a robot that performs work such as gripping, assembly, and the like of various components in manufacturing of a precision apparatus and the like and a control device that controls the robot. In such a robot system, when causing the robot to perform work, in general, the control device teaches the robot a work surface on which the robot performs the work.

An example of a teaching method of a robot is disclosed in, for example, Japanese Patent No. 3671694 (Patent Literature 1).

Patent Literature 1 discloses a robot (a robot system) including a robot main body including an arm, to the distal end portion of which a hand that performs gripping and the like of components can be attached, and a control device that controls the robot main body. In Patent Literature 1, a teaching pendant is connected to the distal end portion of the arm instead of the hand. The control device teaches the robot a work surface using the teaching pendant.

However, in the teaching method for performing the teaching using the teaching pendant, in general, since a user (an operator) checks contact of the work surface and the teaching pendant, determination of the contact is different depending on the user.

Since the control device performs the teaching using the teaching pendant different from the hand that actually performs gripping and the like of components, the control device cannot highly accurately teach the robot the position and the posture of the hand with respect to the work surface. For example, when the work surface is specified in a state in which the hand and the work surface are not in contact with each other, the robot cannot accurately perform work.

SUMMARY

An advantage of some aspects of the invention is to solve at least a part of the problems described above, and the invention can be implemented as the following aspects.

A control device according to an aspect of the invention controls a robot including an arm, an end effector provided in the arm, and a force detector provided in the arm and configured to detect force. After bringing a first portion of the end effector close to a work surface and detecting contact of the first portion and the work surface on the basis of an output from the force detector, the control device brings a second portion of the end effector different from the first portion close to the work surface, detects contact of the second portion and the work surface on the basis of an output from the force detector, and teaches the robot a position of the end effector with respect to the work surface.

With such a control device, since the control device controls the robot including the force detector, it is possible to more highly accurately teach the robot the position of the end effector with respect to the work surface.

With the control device according to the aspect, in the teaching, after bringing the first portion of the end effector into contact with the work surface, the control device brings the second portion different from the first portion into contact with the work surface. Therefore, it is possible to highly accurately teach the robot the position and the posture of the end effector with respect to the work surface.

In the control device according to the aspect, it is preferable that the bringing the second portion close to the work surface includes an operation for changing a posture of the end effector using the first portion as a fulcrum in a state in which the first portion is set in contact with the work surface.

With this configuration, it is possible to particularly highly accurately teach the robot the position and the posture of the end effector with respect to the work surface.

In the control device according to the aspect, it is preferable that the control device calculates a teaching point from an output of the force detector at the time when the first portion comes into contact with the work surface and an output of the force detector at the time when the second portion comes into contact with the work surface.

The teaching point can be calculated on the basis of a plurality of detection results in this way. Therefore, it is possible to further improve accuracy of the position of the teaching point. As a result, it is possible to more highly accurately teach the robot the position of the end effector with respect to the work surface.

In the control device according to the aspect, it is preferable that the control device calculates a posture of the end effector from an output of the force detector at the time when the first portion comes into contact with the work surface and an output of the force detector at the time when the second portion comes into contact with the work surface.

The posture of the end effector can be calculated on the basis of a plurality of detection results in this way. Therefore, it is possible to further improve accuracy of the posture of the end effector with respect to the work surface. As a result, it is possible to more highly accurately teach the robot the posture of the end effector with respect to the work surface.

In the control device according to the aspect, it is preferable that, after bringing the second portion into contact with the work surface, the control device brings a third portion of the end effector different from the first portion and the second portion close to the work surface and detects contact of the third portion and the work surface on the basis of an output from the force detector.

With this configuration, it is possible to more highly accurately teach the robot the position and the posture of the end effector with respect to the work surface.

In the control device according to the aspect, it is preferable that the control device detects positions of the end effector with respect to the work surface in at least three places on the work surface.

With this configuration, it is possible to more highly accurately calculate a coordinate system of the work surface.

In the control device according to the aspect, it is preferable that the control device calculates teaching points respectively in the at least three places and calculates a coordinate system of the work surface from at least a trio of the teaching points.

With this configuration, it is possible to more highly accurately calculate the coordinate system of the work surface.

In the control device according to the aspect, it is preferable that the control device calculates postures of the end effector respectively in the at least three places and determines, from at least a trio of the postures of the end effector, whether the work surface is a plane.

With this configuration, it is possible to more accurately grasp a state of the work surface.

In the control device according to the aspect, it is preferable that the arm of the robot includes a first arm capable of turning around a first turning axis and a second arm provided in the first arm and capable of turning around a second turning axis in an axial direction different from an axial direction of the first turning axis.

Effects by the control device according to the aspect can be particularly conspicuously exhibited for the robot having such a configuration.

A robot according to another aspect of the invention is controlled by the control device according to the aspect.

With this configuration, it is possible to provide a robot controlled by a control device that can highly accurately teach the robot the position and the posture of the end effector with respect to the work surface.

A robot system according to still another aspect of the invention includes: the control device according to the aspect; and a robot controlled by the control device.

With this configuration, it is possible to provide a robot system including the control device that can highly accurately teach the robot the position and the posture of the end effector with respect to the work surface and the robot controlled by the control device.

BRIEF DESCRIPTION OF THE DRAWINGS

The invention will be described with reference to the accompanying drawings, wherein like numbers reference like elements.

DESCRIPTION OF EXEMPLARY EMBODIMENTS

A control device, a robot, and a robot system according to a preferred embodiment of the invention are explained in detail below with reference to the accompanying drawings.

Robot System

Figure 1:
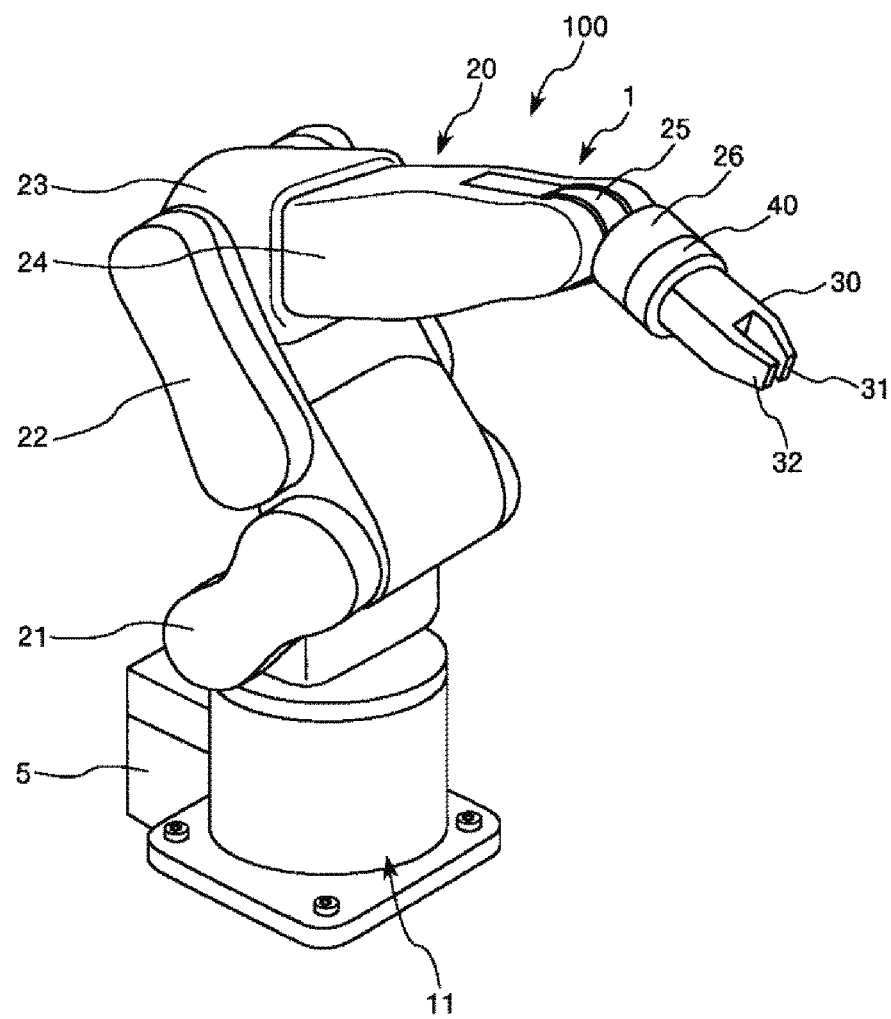
FIG. 1 is a diagram showing a robot system according to a preferred embodiment of the invention.
Figure 2:
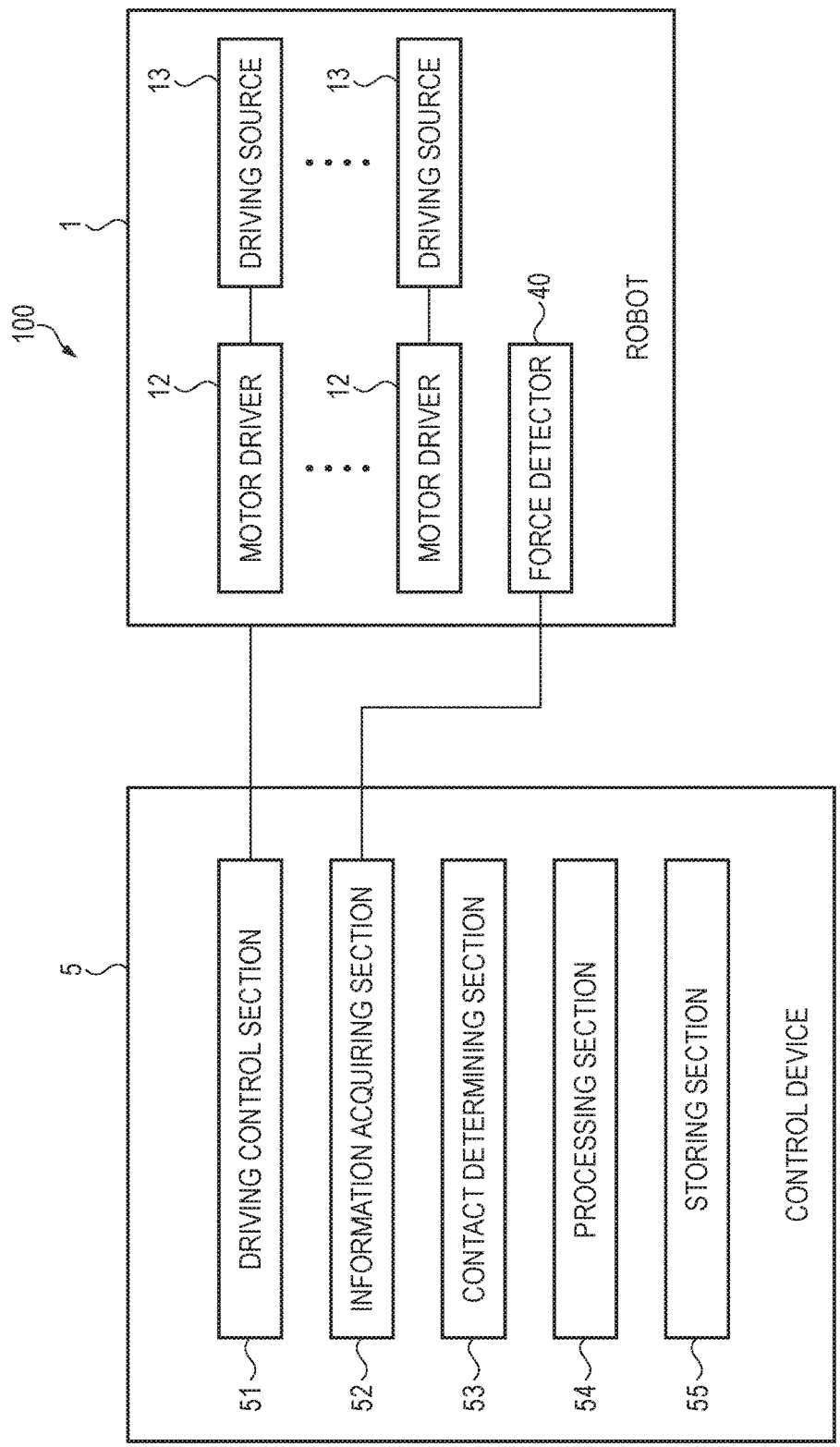
FIG. 2 is a block diagram of the robot system shown in FIG. 1.
Figure 3:
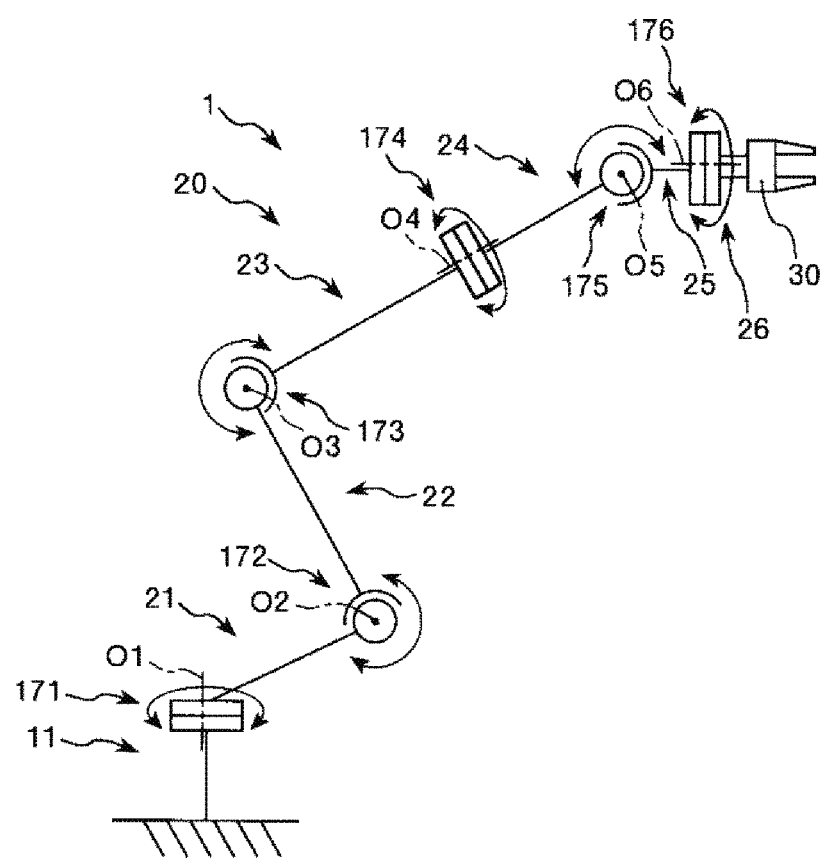
FIG. 3 is a schematic diagram of a robot shown in FIG. 1.
Figure 4:
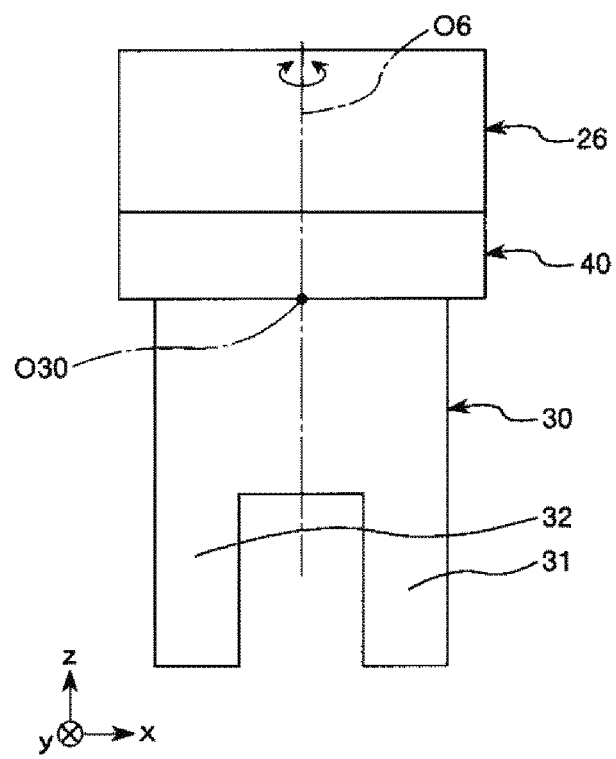
FIG. 4 is a schematic diagram of a hand of the robot shown in FIG. 1.
Figure 5:
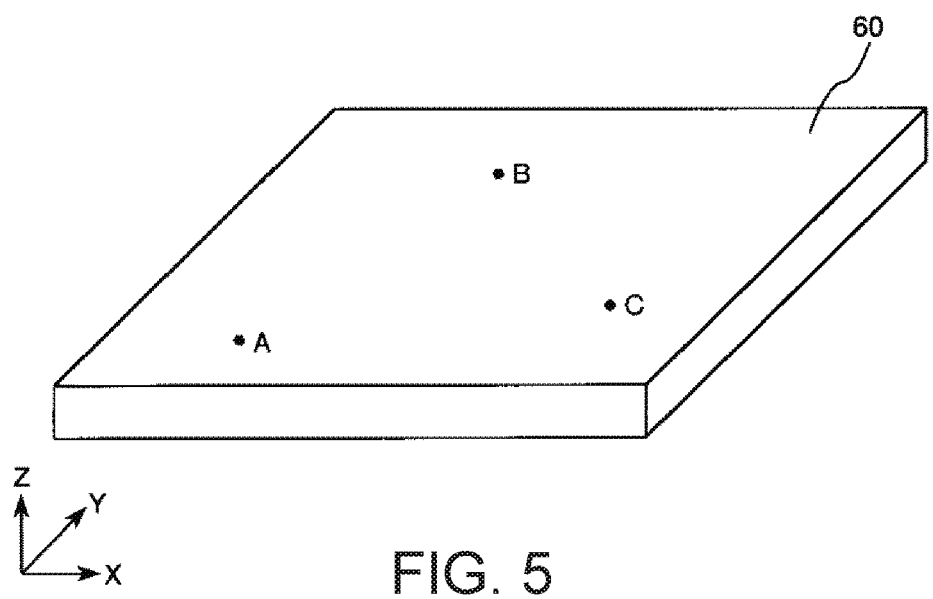
FIG. 5 is a diagram showing a work surface taught to the robot shown in FIG. 1.
Figure 6:
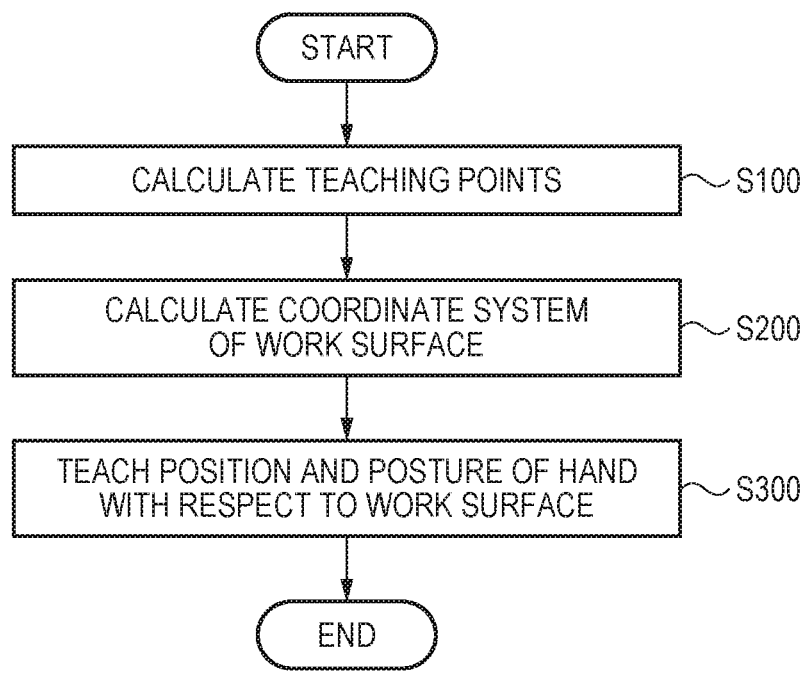
FIG. 6 is a flowchart for explaining the teaching of the work surface to the robot shown in FIG. 1.
Figure 7:
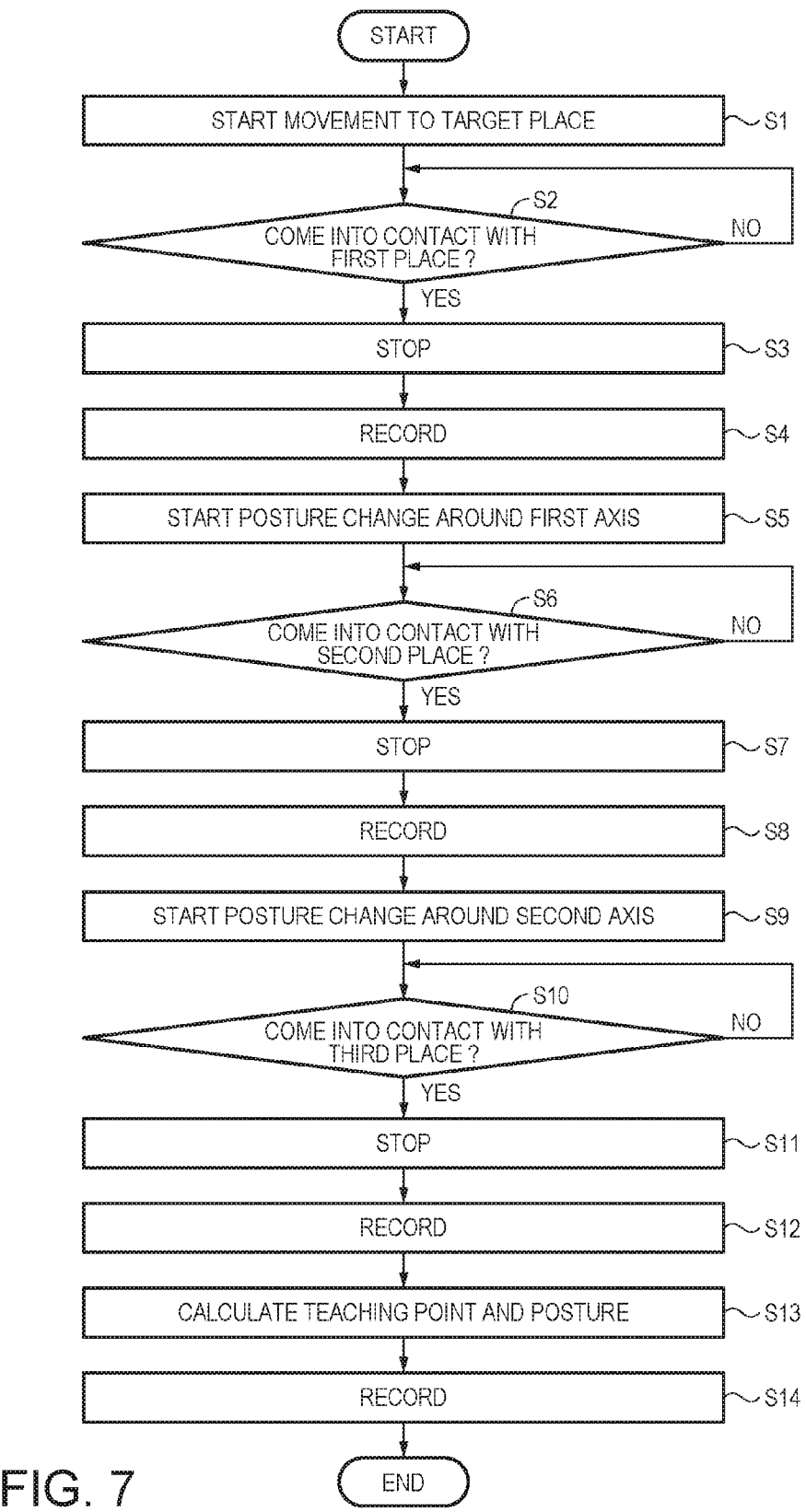
FIG. 7 is a flowchart for explaining calculation of teaching points shown in FIG. 6.
Figure 8:
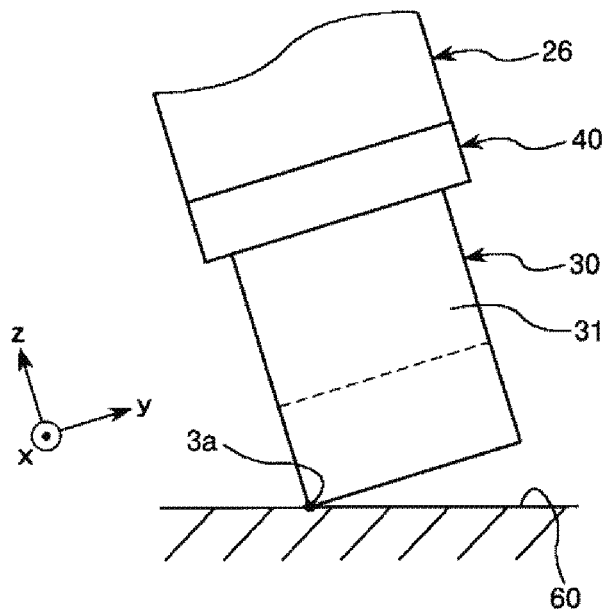
FIG. 8 is a diagram showing a state in which a first portion of a hand and the work surface are in contact with each other.
Figure 9:
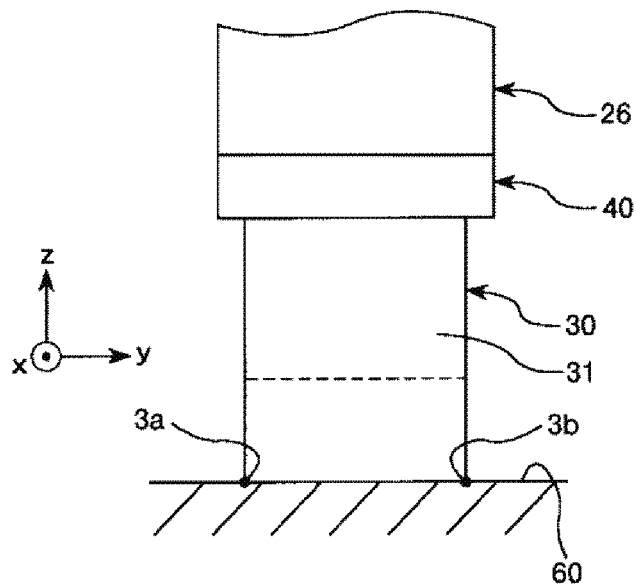
FIG. 9 is a diagram showing a state in which a second portion of the hand and the work surface are in contact with each other.
Figure 10:
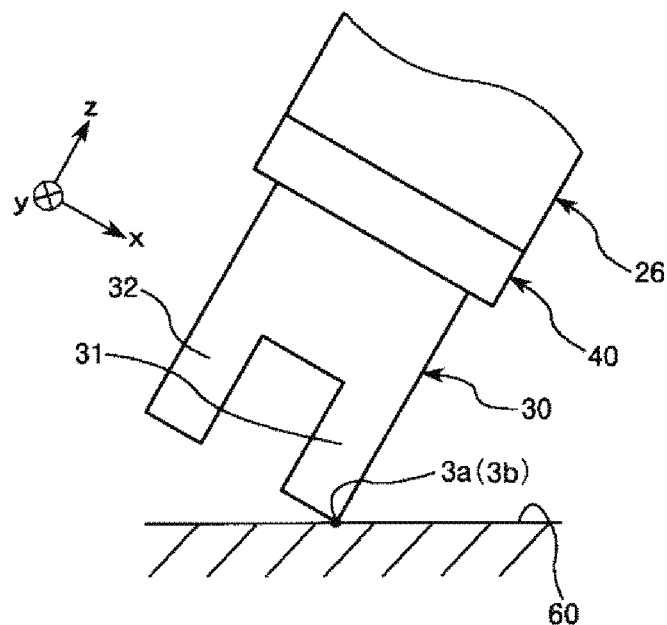
FIG. 10 is a diagram showing a state in which the second portion of the hand and the work surface are in contact with each other.
Figure 11:
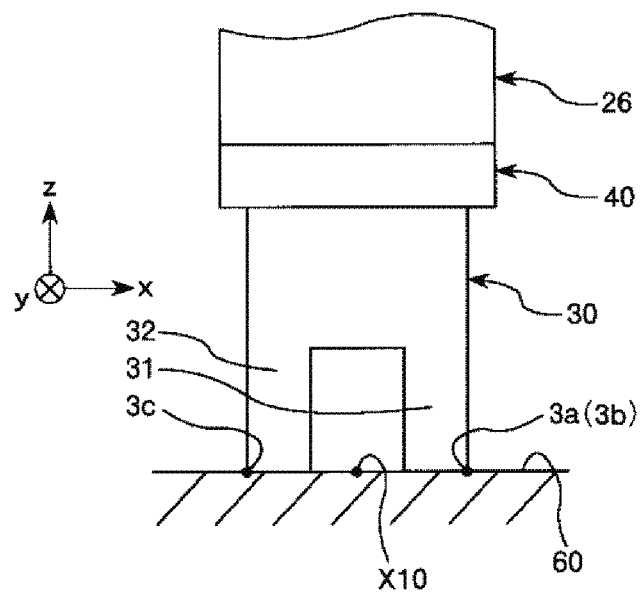
FIG. 11 is a diagram showing a state in which a third portion of the hand and the work surface are in contact with each other.

FIG. 1 is a diagram showing a robot system according to a preferred embodiment of the invention. FIG. 2 is a block diagram of the robot system shown in FIG. 1. FIG. 3 is a schematic diagram of a robot shown in FIG. 1. FIG. 4 is a schematic diagram of a hand of the robot shown in FIG. 1. FIG. 5 is a diagram showing a work surface taught to the robot shown in FIG. 1. FIG. 6 is a flowchart for explaining the teaching of the work surface to the robot shown in FIG. 1. FIG. 7 is a flowchart for explaining calculation of teaching points shown in FIG. 6. FIG. 8 is a diagram showing a state in which a first portion of a hand and the work surface are in contact with each other. FIGS. 9 and 10 are respectively diagrams showing states in which a second portion of the hand and the work surface are in contact with each other. FIG. 11 is a diagram showing a state in which a third portion of the hand and the work surface are in contact with each other.

Note that, in the following explanation, for convenience of explanation, the upper side in FIG. 1 is referred to as "upper" or "upward" and the lower side in FIG. 1 is referred to as "lower" or "downward". The base side in FIG. 1 is referred to as "proximal end" or "upstream" and the opposite side of the base side (a hand side) is referred to as "distal end" or "downstream". The up-down direction in FIG. 1 is referred to as "vertical direction" and the left-right direction in FIG. 1 is referred to as "horizontal direction".

A robot system 100 shown in FIG. 1 includes a robot 1 and a control device 5 that controls the operation of the robot 1. The robot system 100 can be used in, for example, a manufacturing process for manufacturing a precision apparatus such as a wristwatch.

Robot

The robot 1 shown in FIG. 1 can perform supply, removal, conveyance, assembly, and the like of a precision apparatus and components (target objects) configuring the precision apparatus.

The robot 1 is a six-axis vertical multi-joint robot and includes a base 11, a robot arm 20 connected to the base 11, and a force detector 40 and a hand 30 provided at the distal end portion of the robot arm 20. As shown in FIG. 2, the robot 1 includes a plurality of driving sources 13, which generate power for driving the robot arm 20, and a plurality of motor drivers 12.

The base 11 shown in FIG. 1 is a portion for attaching the robot 1 to any setting place. Note that the setting place of the base 11 is not particularly limited. Examples of the setting place include a floor, a wall, a ceiling, and a movable truck.

The robot arm 20 includes a first arm 21 (an arm), a second arm 22 (an arm), a third arm 23 (an arm), a fourth arm 24 (an arm), a fifth arm 25 (an arm), and a sixth arm 26 (an arm). The first arm 21, the second arm 22, the third arm 23, the fourth arm 24, the fifth arm 25, and the sixth arm 26 are coupled in this order from the proximal end side toward the distal end side. The first arm 21 is connected to the base 11. The hand 30 (an end effector), which grips various components and the like, is detachably attached to the distal end of the sixth arm 26.

As shown in FIG. 3, the base 11 and the first arm 21 are coupled via a joint 171. The first arm 21 is capable of turning about a first turning axis O1, which is parallel to the vertical direction, with respect to the base 11.

The first arm 21 and the second arm 22 are coupled via a joint 172. The second arm 22 is capable of turning about a second turning axis O2, which is parallel to the horizontal direction, with respect to the first arm 21. The second turning axis O2 is orthogonal to the first turning axis O1.

The second arm 22 and the third arm 23 are coupled via a joint 173. The third arm 23 is capable of turning about a third turning axis O3, which is parallel to the horizontal direction, with respect to the second arm 22. The third turning axis O3 is parallel to the second turning axis O2.

The third arm 23 and the fourth arm 24 are coupled via a joint 174. The fourth arm 24 is capable of turning about a fourth turning axis O4, which is parallel to the center axis direction of the third arm 23, with respect to the third arm 23.

The fourth arm 24 and the fifth arm 25 are coupled via a joint 175. The fifth arm 25 is capable of turning about a fifth turning axis O5 with respect to the fourth arm 24. The fifth turning axis O5 is orthogonal to the fourth turning axis O4.

The fifth arm 25 and the sixth arm 26 are coupled via a joint 176. The sixth arm 26 is capable of turning about a sixth turning axis O6 with respect to the fifth arm 25. The sixth turning axis O6 is orthogonal to the fifth turning axis O5.

As shown in FIG. 2, a plurality of driving sources 13 including motors such as servomotors and reduction gears are respectively provided in the arms 21 to 26. That is, the robot 1 includes the plurality of (six in this embodiment) driving sources 13 as many as the arms 21 to 26. The arms 21 to 26 are respectively controlled by the control device 5 via a plurality of (six in this embodiment) motor drivers 12 electrically connected to the driving sources 13 corresponding thereto. Note that the motor drivers 12 are housed in the base 11.

Angle sensors (not shown in the figure) such as encoders or rotary encoders are provided in the driving sources 13. Consequently, it is possible to detect rotation angles of rotation axes of rotating shafts of the motors or the reduction gears of the driving sources 13.

As shown in FIG. 1, the force detector 40 is formed in a circular tabular shape and provided at the distal end portion of the sixth arm 26. The fourth detector 40 is located between the sixth arm 26 and the hand 30.

As shown in FIG. 4, the force detector 40 is a six-axis force sensor that can detect six components including translational force components Fx, Fy, and Fz in three axes (an x axis, a y axis, and a z axis) directions orthogonal to one another and rotational force components (moments) Mx, My, and Mz around the three axes (the x axis, the y axis, and the z axis). Among the three axes (the x axis, the y axis, and the z axis), the x axis and the y axis are parallel to the distal end face (the proximal end face) of the force detector 40 and the z axis is parallel to the thickness direction of the fourth detector 40.

With such a force detector 40, the robot 1 can detect a force and a moment applied to the hand 30.

Note that, in this embodiment, the force detector 40 is provided at the distal end portion of the sixth arm 26. However, a setting place of the force detector 40 may be any place as long as the place is a position where the force detector 40 can detect the force and the moment applied to the hand 30. For example, the force detector 40 may be provided in the proximal end portion of the sixth arm 26.

As shown in FIGS. 1 and 4, the hand 30 (the end effector) is detachably attached to the distal end portion of the sixth arm 26 (the distal end portion of the robot arm 20) via the force detector 40. The hand 30 includes two fingers 31 and 32 and can grip, for example, various components with the fingers 31 and 32.

As shown in FIG. 4, in this embodiment, the hand 30 is attached to the robot arm 20 such that a center O30 of the proximal end face of the hand 30 (and the center of a region between the two fingers 31 and 32) is located on the sixth turning axis O6 of the arm 26.

Note that, in this embodiment, as explained above, the hand 30 is provided to be detachably attachable to the robot arm 20. However, the hand 30 may be fixed to the robot arm 20. In this embodiment, the hand 30 includes the two fingers 31 and 32. The number of fingers of the hand 30 is optional and may be, for example, three or four. In this embodiment, the hand 30 is used as the end effector. However, the end effector may be a component other than the hand 30. The end effector may be any component that can perform work (e.g., gripping, lifting, and attraction) on various components. The number of end effectors and the arrangement of the end effector with respect to the robot arm 20 are not limited to the number and the arrangement shown in the figure.

The configuration of the robot 1 is briefly explained above. The robot 1 having such a configuration is the vertical multi-joint robot including the six (the plurality of) arms 21 to 26 as explained above. Therefore, the robot 1 has a wide driving range and can exhibit high workability.

Control Device

The control device 5 shown in FIG. 1 controls the sections of the robot 1. The control device 5 can be configured by, for example, a personal computer (PC) incorporating a CPU (Central Processing Unit), a ROM (Read Only Memory), and a RAM (Random Access Memory).

As shown in FIG. 2, the control device 5 includes a driving control section 51, an information acquiring section 52, a contact determining section 53, a processing section 54, and a storing section 55.

The driving control section 51 controls driving of the driving sources 13 that perform driving of the arms 21 to 26. For example, the driving control section 51 can drive and stop the arms 21 to 26 independently from one another on the basis of detection results (signals) of the force detector 40 and the angle sensors (not shown in the figure).

The information acquiring section 52 acquires the detection results of the force detector 40.

The contact determining section 53 determines on the basis of detection results (the translational force components Fx, Fy, and Fz and the rotational force components Mx, My, and Mz) acquired by the information acquiring section 52 and information stored in the storing section 55 explained below (detection results output from the force detector 40 when the hand 30 and a work surface 60 come into contact with each other) whether the hand 30 comes into contact with the work surface 60 (see FIG. 5).

The processing section 54 calculates teaching point s and a posture of the hand 30 on the basis of the detection results acquired by the information acquiring section 52.

The storing section 55 stores computer programs, data, and the like for the control device 5 to perform various kinds of processing. Further, information (a database) such as detection results output from the force detector 40 when the hand 30 comes into contact with the work surface 60 is stored in the storing section 55 in advance.

Note that, in this embodiment, as shown in FIG. 1, the control device 5 is provided separately from the robot 1. However, the control device 5 may be incorporated in the robot 1.

The basic configuration of the robot system 100 is briefly explained above.

In the robot system 100, when the robot 1 performs work such as gripping of various components on the work surface 60, the control device 5 teaches the robot 1 the position and the posture of the hand 30 with respect to the work surface 60 shown in FIG. 5.

In work of the robot 1, workability by the hand 30 is improved by setting the hand 30 (specifically, the distal end face of the finger 31 and the distal end face of the finger 32) substantially parallel to the work surface 60. The work surface 60 is, for example, a surface on a workbench or a surface of a component to be, for example, assembled by the robot 1. The work surface 60 on which the robot 1 performs work does not always face a fixed direction. Therefore, the control device 5 teaches the robot 1 the position and the posture of the hand 30 with respect to the work surface 60 shown in FIG. 5.

As shown in FIG. 6, the teaching of the robot 1 includes calculation of teaching points (step S100), calculation of a coordinate system of the work surface (step S200), and teaching of the position and the posture of the hand with respect to the work surface (step S300).

Note that, in the following explanation, as shown in FIG. 5, a coordinate system of the work surface 60 to be finally calculated is parallel to an X-Y plane including an X axis and a Y axis and has a Z axis as a normal.

Calculation of Teaching Points (Step S100)

First, the control device 5 performs calculation of teaching points (step S100).

The calculation of teaching points (step S100) is explained with reference to a flowchart of FIG. 7. In the calculation of teaching points (step S100), the control device 5 calculates teaching points of the hand 30 in any three places A, B, and C (three measurement points) separated from one another on the work surface 60.

First, the control device 5 calculates a teaching point in the place A.

As shown in FIG. 7, the control device 5 drives the robot arm 20 according to a command of the driving control section 51 to start to bring (move) the hand 30 close to the place A (a target place) (step S1). When bringing the hand 30 close to the place A, the control device 5 brings the hand 30 close to the place A in a state in which the hand 30 is tilted with respect to the work surface 60.

The control device 5 brings the hand 30 close to the place A as explained above. The control device 5 determines, with the contact determining section 53, on the basis of detection results of the force detector 40 acquired by the information acquiring section 52 whether the hand 30 has come into contact with the work surface 60 (step S2). The control device 5 continues to bring the hand 30 close to the place A until it is determined that the hand 30 has come into contact with the work surface 60. When it is determined that the hand 30 has come into contact with the work surface 60, the control device 5 stops the driving of the robot arm 20 according to a command of the driving control section 51 (step S3).

When the hand 30 comes into contact with the work surface 60, for example, the state of the hand 30 changes to a state shown in FIG. 8. A portion of the hand 30 that comes into contact with the work surface 60 first is referred to as "first portion 3a". In this embodiment, the first portion 3a is one end of the distal end face of the finger 31. In this first contact, the finger 32 is not in contact with the work surface 60.

Subsequently, the control device 5 stores (records), in the storing section 55, detection results (the translational force components Fx, Fy, and Fz and the rotational force components Mx, My, and Mz) of the force detector 40 at the time when the first portion 3a comes into contact with the work surface 60 (step S4).

Subsequently, the control device 5 starts to change a posture around a first axis of the hand 30 (step S5). While keeping the first portion 3a in contact with the work surface 60, the control device 5 turns the hand 30 around the first axis (in the illustrated case, the y axis) using the first portion 3a as a fulcrum and in a direction in which the distal end portion of the hand 30 comes into contact with the work surface 60.

The control device 5 turns the hand 30 as explained above. The control device 5 determines, with the contact determining section 53, on the basis of the detection results of the force detector 40 acquired by the information acquiring section 52 whether a second portion 3b different from the first portion 3a of the hand 30 has come into contact with the work surface 60 (step S6). The control device 5 turns the hand 30 around the first axis until it is determined that the second portion 3b has come into contact with the work surface 60. When it is determined that the second portion 3b has come into contact with the work surface 60, the control device 5 stops the driving of the robot arm 20 according to a command of the driving control section 51 (step S7).

When the second portion 3b comes into contact with the work surface 60, the state of the hand 30 changes to, for example, a state shown in FIGS. 9 and 10. In this embodiment, the second portion 3b is the end on the opposite side of the first portion 3a of the distal end face of the finger 31. As shown in FIG. 10, in the second contact, the finger 32 is not in contact with the work surface 60.

Subsequently, the control device 5 stores (records), in the storing section 55, detection results (the translational force components Fx, Fy, and Fz and the rotational force components Mx, My, and Mz) of the force detector 40 at the time when the first portion 3a and the second portion 3b come into contact with the work surface 60 (step S8).

Subsequently, the control device 5 starts to change a posture around a second axis of the hand 30 (step S9). While keeping the first portion 3a and the second portion 3b in contact with the work surface 60, the control device 5 turns the hand 30 around the second axis (in the illustrated case, the y axis) using, as a supporting shaft, a line segment (an imaginary line) passing the first portion 3a and the second portion 3b and in a direction in which the distal end portion of the hand 30 comes into contact with the work surface 60.

The control device 5 turns the hand 30 as explained above. The control device 5 determines, with the contact determining section 53, on the basis of detection results of the force detector 40 acquired by the information acquiring section 52 whether a third portion 3c different from the first portion 3a and the second portion 3b of the hand 30 has come into contact with the work surface 60 (step S10). The control device 5 turns the hand 30 around the second axis until it is determined that the third portion 3c has come into contact with the work surface 60. When it is determined that the third portion 3c has come into contact with the work surface 60, the control device 5 stops the driving of the robot arm 20 according to a command of the driving control section 51 (step S11).

When the third portion 3c comes into contact with the work surface 60, for example, the state of the hand 30 changes to a state shown in FIG. 11. In this embodiment, the third portion 3c is the distal end face of the finger 32. In the third contact of the hand 30, the entire distal end face of the hand 30 (the distal end faces of the finger 31 and the finger 32) comes into contact with the work surface 60.

Subsequently, the control device 5 stores (records), in the storing section 55, detection results (the translational force components Fx, Fy, and Fz and the rotational force components Mx, My, and Mz) of the force detector 40 at the time when the first portion 3a, the second portion 3b, and the third portion 3c come into contact with the work surface 60 (step S12).

Subsequently, the control device 5 calculates, with the processing section 54, the position of a teaching point X10 and the posture of the hand 30 with respect to the work surface 60 on the basis of the detection results (the translational force components Fx, Fy, and Fz and the rotational force components Mx, My, and Mz) of the force detector 40 stored (recorded) in steps S4, S8, and S12 (step S13). Note that, in this embodiment, the control device 5 calculates, as the teaching point X10, the center of the distal end portion of the hand 30 (specifically, the center of the region between the two fingers 31 and 32).

The control device 5 stores (records), in the storing section 55, the calculated position of the teaching point X10 and the calculated posture of the hand 30 with respect to the work surface 60 (step S14).

The teaching point X10 and the posture of the hand 30 with respect to the work surface 60 in the place A are calculated as explained above. In this way, the teaching point X10 and the posture of the hand 30 with respect to the work surface 60 are calculated from a plurality of portions (the first portion 3*a*, the second portion 3*b*, and the third portion 3*c*). Therefore, it is possible to further improve accuracy of the position of the teaching point X10 and accuracy of the posture of the hand 30 with respect to the work surface 60.

Similarly, the control device 5 also calculates teaching points X10 and the postures of the hand 30 with respect to the work surface 60 in the place B and the place C. Consequently, the teaching points X10 and the postures of the hand 30 with respect to the work surface 60 in the three places (the places A, B, and C) are calculated.

Calculation of a Coordinate System of the Work Surface (Step S200)

Subsequently, as shown in FIG. 6, the control device 5 calculates a coordinate system of the work surface (step S200).

In the calculation of the coordinate system of the work surface (step S200), the control device 5 calculates, with the processing section 54, a coordinate system of the work surface 60 on the basis of the teaching points X10 in the three places A, B, and C. As explained above, the teaching points X10 are calculated from the plurality of portions respectively in the three places A, B, and C. Therefore, it is possible to more highly accurately calculate the coordinate system of the work surface 60.

In the calculation of the coordinate system of the work surface (step S200), the control device 5 determines, with the processing section 54, from the postures of the hand 30 in the three places A, B, and C, whether the work surface 60 is a plane. For example, the control device 5 determines that the work surface 60 is a plane if a difference between the rotational force component Mx around the X axis and the rotational force component My around the Y axis in the three places A, B, and C is within a predetermined range. That is, the control device 5 determines that the work surface 60 is a plane if the rotational force components Mx and My in the three places A, B, and C are substantially equal. On the other hand, if the difference between the rotational force components Mx and My in the three places A, B, and C is outside the predetermined range, the control device 5 determines that the work surface 60 is not a plane and is a curved surface or has unevenness and the like. Consequently, it is possible to more accurately grasp a state of the work surface 60.

Teaching of the Position of the Hand with Respect to the Work Surface (Step S300)

Subsequently, as shown in FIG. 6, the control device 5 teaches the robot the position of the hand with respect to the work surface (step S300).

In the teaching of the position of the hand with respect to the work surface (step S300), the control device 5 teaches the robot 1 the position and the posture of the hand 30 with respect to the work surface 60 on the basis of the coordinate system of the work surface 60.

The teaching of the robot 1 ends through the teaching of the work surface (step S300) explained above (see FIG. 6).

The teaching of the robot 1 is explained above.

As explained above, in the robot system 100, since the control device 5 controls the robot 1 including the force detector 40, it is possible to more highly accurately teach the robot 1 the position of the hand 30 with respect to the work surface 60. Therefore, it is possible to omit use of a tool exclusive for teaching such as a teaching pendant. It is possible to omit determination of contact of the work surface 60 and the hand 30 by a user (an operator).

In this embodiment, as explained above, in the teaching of the robot 1, after bringing the first portion 3*a* of the hand 30 into contact with the work surface 60, the control device 5 brings the second portion 3*b* different from the first portion 3*a* into contact with the work surface 60 while keeping the first portion 3*a* in contact with the work surface 60. Thereafter, the control device 5 brings the third portion 3*c* different from the first portion 3*a* and the second portion 3*b* into contact with the work surface 60 while keeping the first portion 3*a* and the second portion 3*b* in contact with the work surface 60. In this way, in this embodiment, in the teaching of the robot 1, the control device 5 performs a so-called copying operation for bringing the hand 30 into contact with the work surface 60 in the order of the first portion 3*a*, the second portion 3*b*, and the third portion 3*c*. Therefore, since the first portion 3*a*, the second portion 3*b*, and the third portion 3*c* can be surely brought into contact with the work surface 60, it is possible to highly accurately teach the robot 1 the position and the posture of the hand 30 with respect to the work surface 60.

In particular, when bringing the second portion 3*b* into contact with the work surface 60, the control device 5 turns the hand 30 around the first axis, that is, one axis using the first portion 3*a* as a fulcrum. Similarly, when bringing the third portion 3*c* into contact with the work surface 60, the control device 5 turns the hand 30 around the second axis, that is, one axis different from the first axis using, as a supporting shaft, an imaginary line passing the first portion 3*a* and the second portion 3*b*. In this way, in this embodiment, since the control device 5 brings the different portions (the first portion 3*a*, the second portion 3*b*, and the third portion 3*c*) of the hand 30 into contact with the work surface 60 in order, it is possible to more surely bring the portions into contact with the work surface 60. Accordingly, it is possible to more easily and more surely bring the entire distal end face of the hand 30 into contact with the work surface 60. Therefore, it is possible to more highly accurately calculate the coordinate system of the work surface 60 and the posture of the hand 30. As a result, it is possible to more highly accurately teach the robot 1 the position and the posture of the hand 30 with respect to the work surface 60.

As explained above, when bringing the hand 30 close to the place A first, the control device 5 brings the hand 30 close to the place A in a state in which the hand 30 is tilted with respect to the work surface 60. That is, when bringing the hand 30 into contact with the work surface 60 first, the control device 5 brings the hand 30 close to the work surface 60 in a state in which the hand 30 is tilted in the direction crossing the X, Y, and Z axes of the work surface 60. Consequently, when bringing the hand 30 into contact with the work surface 60 at the first time, it is possible to bring only the first portion 3a of the hand 30 into contact with the work surface 60. Therefore, thereafter, it is easy to bring the second portion 3b and the third portion 3c into contact with the work surface 60 in this order. Accordingly, it is possible to more easily and more surely bring the entire distal end face of the hand 30 into contact with the work surface 60.

In this embodiment, as explained above, the robot 1 to be taught is the vertical multi-joint robot. The work surface 60, on which the robot 1 having such a configuration performs work, is often not limited to a fixed place. Therefore, by teaching the robot 1, which is the vertical multi-joint robot, as explained above, it is possible to further improve workability of the robot 1.

Note that, as explained above, in the teaching of the robot 1, the number of calculated teaching points is three. However, when the robot 1 is the vertical multi-joint robot, the number of teaching points only has to be at least equal to or larger than three. The number is not limited and is optional.

In this embodiment, the example is explained in which the robot 1 is the vertical multi-joint robot. However, when the robot 1 is a horizontal multi-joint robot, the contact of the third portion 3c may be omitted. When the robot 1 is the horizontal multi-joint robot, the contact of the place C may be omitted. That is, it is sufficient to calculate one teaching point from at least two contact portions and then calculate at least two teaching points.

Note that, examples of the horizontal multi-joint robot include a robot including a base, a first arm (an n-th arm) connected to the base and extending in the horizontal direction, and a second arm (an (n+1)-th arm) connected to the first arm and including a portion extending in the horizontal direction.

In the teaching of the robot 1, in step S200, the control device 5 calculates the coordinate system of the work surface 60. However, the control device 5 may calculate a coordinate system of the entire work surface 60 with respect to a coordinate system of a reference plane (an imaginary plane) set in advance.

The control device, the robot, and the robot system according to the embodiment are explained above on the basis of the embodiment shown in the figures. However, the invention is not limited to this. The components of the sections can be replaced with any components having the same functions. Any other components may be added. The invention may be combinations of any two or more components (features) in the embodiment.

In the embodiment, the number of turning axes of the robot arm of in the robot is six. However, the invention is not limited to this. The number of turning axes of the robot arm may be, for example, two, three, four, five, or seven or more. In the embodiment, the number of arms of the robot is six. However, the invention is not limited to this. The number of arms of the robot may be, for example, two, three, fourth, five, or seven or more.

In the embodiment, the number of robot arms of the robot is one. However, the invention is not limited to this. The number of robot arms of the robot may be, for example, two or more. That is, the robot may be a plural-arm robot such as a double-arm robot.

The entire disclosure of Japanese Patent Application No. 2015-175430, filed Sep. 7, 2015 is expressly incorporated by reference herein.

What is claimed is:

1. A control device that controls a robot including an arm, an end effector provided in the arm, and a force detector provided in the arm and configured to detect force,
after bringing a first portion of the end effector close to a work surface and detecting contact of the first portion and the work surface on the basis of an output from the force detector, the control device bringing a second portion of the end effector different from the first portion close to the work surface, detecting contact of the second portion and the work surface on the basis of an output from the force detector, and teaching the robot a position of the end effector with respect to the work surface,
wherein the bringing the second portion close to the work surface includes an operation for changing a posture of the end effector using the first portion as a fulcrum in a state in which the first portion is set in contact with the work surface.

2. The control device according to claim 1, wherein the control device calculates a teaching point from an output of the force detector at a time when the first portion comes into contact with the work surface and an output of the force detector at a time when the second portion comes into contact with the work surface.

3. The control device according to claim 1, wherein the control device calculates a posture of the end effector from an output of the force detector at a time when the first portion comes into contact with the work surface and an output of the force detector at a time when the second portion comes into contact with the work surface.

4. The control device according to claim 1, wherein, after bringing the second portion into contact with the work surface, the control device brings a third portion of the end effector different from the first portion and the second portion close to the work surface and detects contact of the third portion and the work surface on the basis of an output from the force detector.

5. The control device according to claim 1, wherein the control device detects positions of the end effector with respect to the work surface in at least three places on the work surface.

6. The control device according to claim 5, wherein the control device calculates teaching points respectively in the at least three places and calculates a coordinate system of the work surface from at least a trio of the teaching points.

7. The control device according to claim 5, wherein the control device calculates postures of the end effector respectively in the at least three places and determines, from at least a trio of the postures of the end effector, whether the work surface is a plane.

8. The control device according to claim 1, wherein the arm of the robot includes a first arm configured to turn around a first turning axis and a second arm provided in the first arm and configured to turn around a second turning axis in an axial direction different from an axial direction of the first turning axis.

* * * * *